(12) United States Patent
Kwon (10) Patent No.: US 8,995,120 B2
(45) Date of Patent: Mar. 31, 2015

(54) CARRIERLESS DRIVE ASSEMBLY USING DRIVE MOUNTING HOLES IN SERVERS AND STORAGES

(71) Applicant: Dell Products L.P., Round Rock, TX (US)

(72) Inventor: Haesung Kwon, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 13/775,400

(22) Filed: Feb. 25, 2013

(65) Prior Publication Data

US 2014/0240908 A1 Aug. 28, 2014

(51) Int. Cl.
*G06F 1/16* (2006.01)
*G06F 1/18* (2006.01)

(52) U.S. Cl.
CPC . *G06F 1/183* (2013.01); *G06F 1/18* (2013.01)
USPC .................................................... 361/679.33

(58) Field of Classification Search
CPC .................................. G06F 1/183; G06F 1/18
USPC ....................................... 361/679.33, 679.02
See application file for complete search history.

(56) References Cited

U.S. PATENT DOCUMENTS

| | | | | |
|---|---|---|---|---|
| 6,667,880 | B2 * | 12/2003 | Liu et al. | 361/679.35 |
| 6,944,013 | B2 * | 9/2005 | Yang | 361/679.33 |
| 6,980,429 | B2 * | 12/2005 | Ericksn et al. | 361/679.32 |
| 7,460,365 | B2 * | 12/2008 | Morris | 361/679.33 |
| 7,471,510 | B2 * | 12/2008 | He | 361/679.33 |
| 8,289,691 | B2 * | 10/2012 | Peng et al. | 361/679.33 |
| 8,295,044 | B2 * | 10/2012 | Chen et al. | 248/224.8 |
| 8,693,182 | B2 * | 4/2014 | Kuo et al. | 361/679.33 |
| 2005/0155050 | A1 * | 7/2005 | Tucker et al. | 720/654 |
| 2012/0300387 | A1 * | 11/2012 | Chen | 361/679.33 |
| 2013/0163182 | A1 * | 6/2013 | Guo et al. | 361/679.33 |
| 2014/0125209 | A1 * | 5/2014 | Kyle et al. | 312/317.1 |

OTHER PUBLICATIONS

Kyle, L.A., U.S. Appl. No. 13/670,589, filed Nov. 7, 2012 entitled Systems and Methods for Insertion and Removal of an Information Handling Resource.

* cited by examiner

*Primary Examiner* — Lisa Lea Edmonds
(74) *Attorney, Agent, or Firm* — Terrile, Cannatti, Chambers & Holland, LLP; Stephen A. Terrile (57) ABSTRACT

A drive assembly comprising a drive and a drive carrier. The drive carrier includes an active bar which comprises a plurality of drive holders and an engagement mechanism. The active bar of a drive assembly performs a plurality of drive assembly functions.

14 Claims, 7 Drawing Sheets

CARRIERLESS DRIVE ASSEMBLY USING DRIVE MOUNTING HOLES IN SERVERS AND STORAGES

BACKGROUND OF THE INVENTION

1. Field of the Invention

The present invention relates to information handling systems and more particularly to a carrierless drive assembly for use with information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with drive assemblies via which drives, such as hard disk drives (HDDs) or solid state drives (SSDs), are coupled to and incorporated into the information handling system. One issue relating to known drive assemblies is that drive carriers (also sometimes referred to a drive cages) are often necessary to mount the drive in the chassis of the information handling system. A relatively large portion of the effective volume of the chassis of the information handling system is consumed with this carrier. Additionally, known drive carriers are often implemented to include a plurality of discrete parts. These discrete parts can include a drive support portion, a latching mechanism, and a release mechanism. Additionally, known drive carriers may have difficulty controlling a wide range of retention force between the drive and the drive carrier due to a required balance tradeoff between an insertion friction and a retention force. Thus, for a drive carrier having a high retention force, the insertion friction may be so high as to make insertion of the drive not feasible.

SUMMARY OF THE INVENTION

In accordance with the present invention, a drive assembly is provided with an active bar which comprises a drive holder portion and an engagement mechanism. The active bar of a drive assembly performs a plurality of drive assembly functions.

More specifically, in some embodiments the invention relates to a drive assembly comprising a drive and a drive carrier. The drive carrier includes a divider wall and an active bar coupled with the divider wall where the divider wall includes a recess. The active bar comprising a plurality of drive holder portions, an indented portion and an engagement mechanism. The indented portion mates with the recess of the first divider wall when the active bar is in a non-retention position and causes the drive holder portion to exert retention pressure on the drive when the active bar is in a retention position.

In other embodiments, the invention relates to an information handling system comprising a processor and a drive assembly coupled to the processor. The drive assembly includes a drive and a drive carrier. The drive carrier includes a divider wall and an active bar coupled with the divider wall where the divider wall includes a recess. The active bar comprising a plurality of drive holder portions, an indented portion and an engagement mechanism. The indented portion mates with the recess of the first divider wall when the active bar is in a non-retention position and causes the drive holder portion to exert retention pressure on the drive when the active bar is in a retention position.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
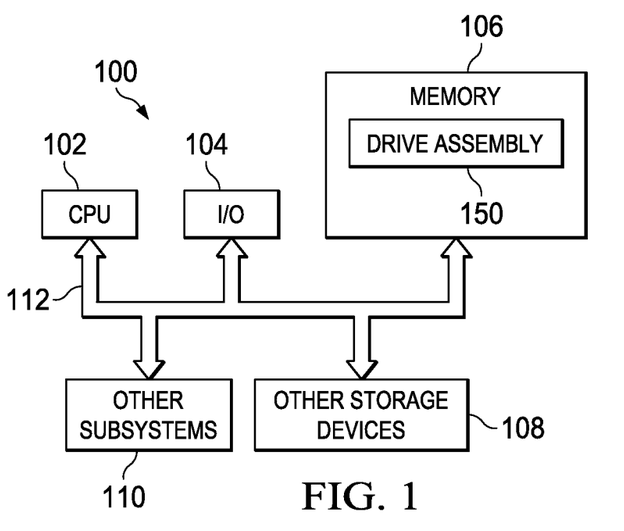
FIG. 1 shows a block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

The memory 106 further includes a drive assembly 150. The drive assembly 150 includes a drive as well as a drive carrier. The drive carrier comprises an active bar which comprises a drive holder portion and an engagement mechanism. The active bar of the drive assembly 150 performs a plurality of drive assembly functions.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
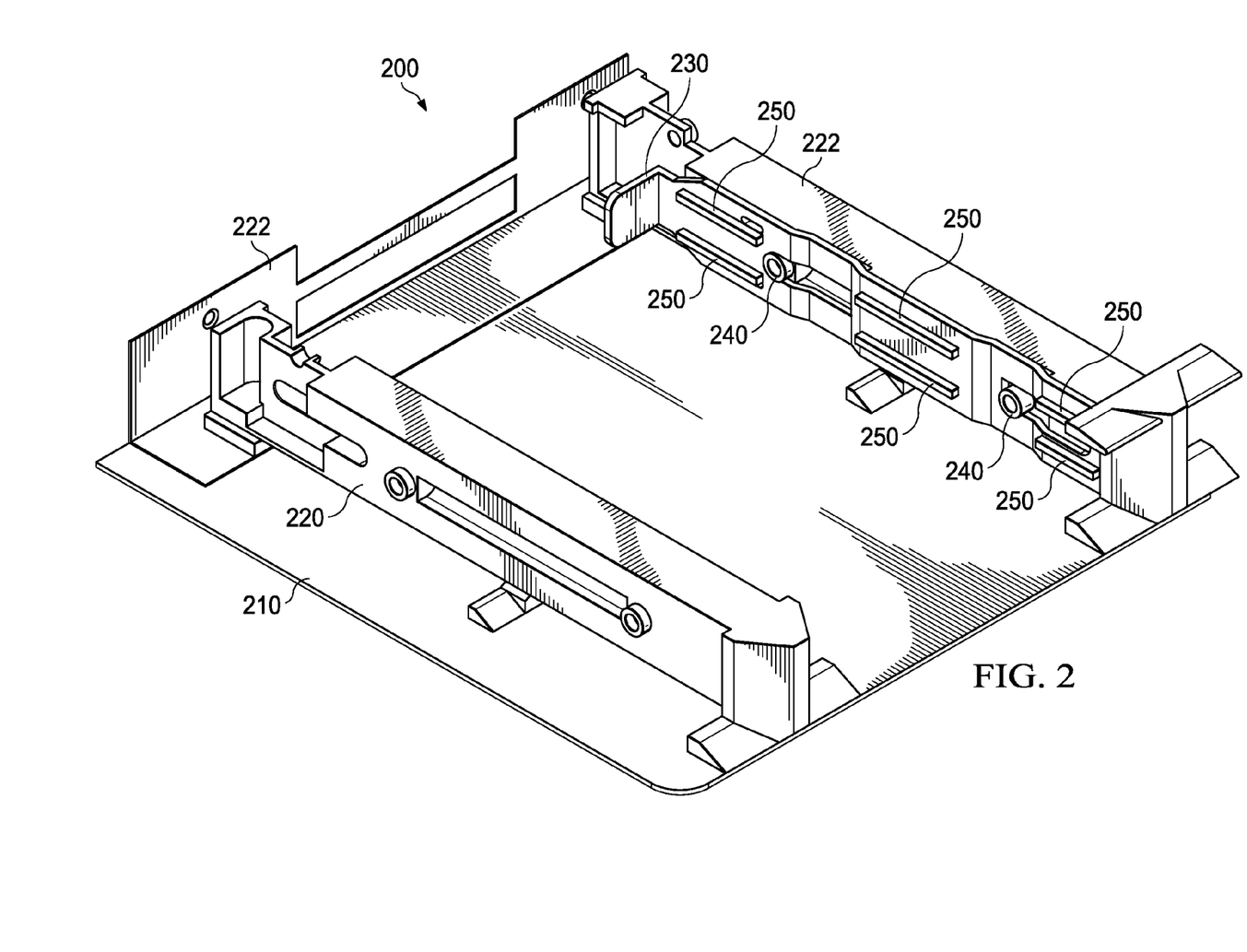
FIG. 2 shows a perspective view of a drive carrier.
Figure 3:
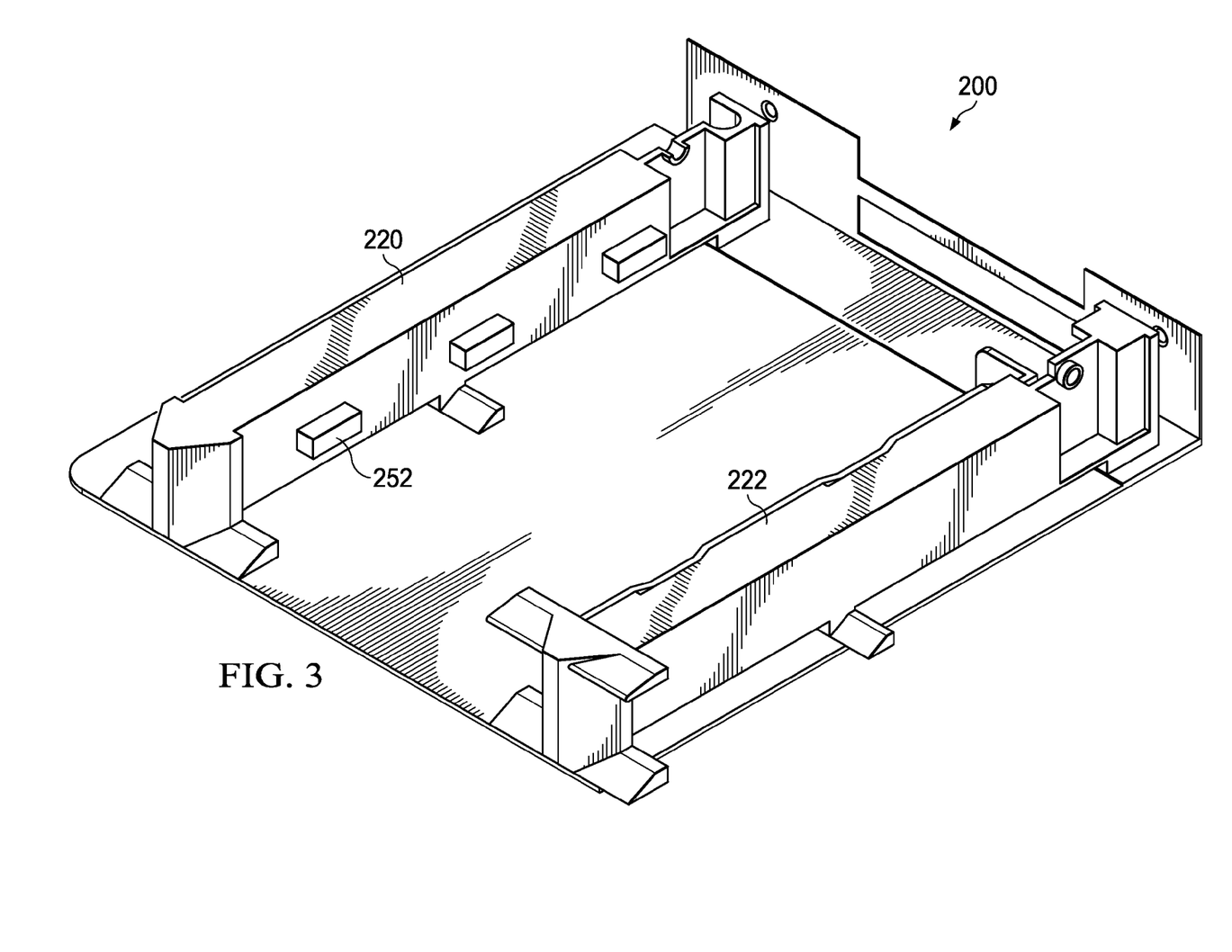
FIG. 3 shows another perspective view of the drive carrier.
Figure 4:
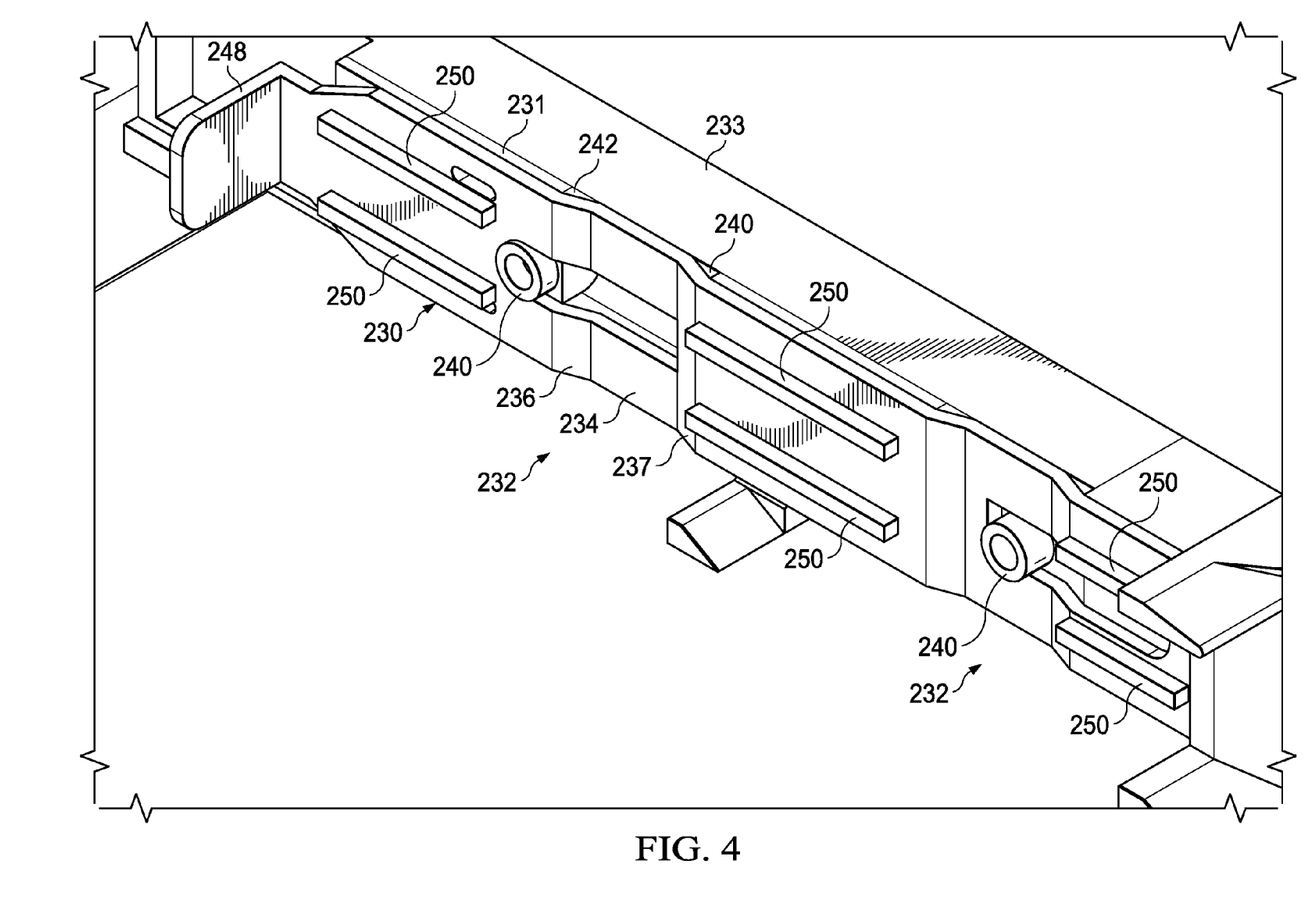
FIG. 4 shows a perspective view of an active bar included within a drive assembly.

Referring to FIGS. 2, 3 and 4, perspective views of a drive carrier 200 is shown. The drive carrier comprises a base 210 to which a nest spine 212 is irremovably attached (e.g., via welding). The drive carrier further comprises a first divider wall 220 and a second divider wall 222. The second divider wall 222 is coupled with an active bar 230.

The active bar 230 (also referred to as a snap-in slide) is movably coupled with the second divider wall 222 via protrusions 240 which project from an inwardly facing surface of the second divider wall 222. The protrusions 240 mate with slots 242 longitudinally positioned in the active bar 230.

The active bar 230 further includes a plurality of drive holder portions 231 as well as first and second indented portions 232. Each indented portion 232 mates with a corresponding recess 233 of the first divider wall 220. Each indented portion 232 includes a flat portion 234 as well as first and second angled portions 236, 237, respectively. In certain embodiments, each recess 233 includes a flat portion 240 as well as a leading edge angled portion 242. When the active bar 230 is in a non-retention position, the flat portion 234 of the active bar substantially mates with the flat portion 234 of the recess. Additionally, when the active bar 230 is in the non-retention position, the first angled portion 236 of the active bar 230 substantially mates with the leading edge angled portion 242 of the recess 233.

The active bar 230 further includes an engagement portion 248 which projects inwardly at substantially (i.e., +/−10%) perpendicular from the portion of the active bar which is coupled with the second divider wall 222. In certain embodiments, the engagement portion 248 along with the protrusions 240 and the slots 242 provide an engagement mechanism for engaging a drive when the drive is inserted into the drive carrier 200.

In certain embodiments, the active bar 230 further comprises a plurality of longitudinal protrusions 250 attached to the drive holder portions 231. In certain embodiments, the longitudinal protrusions 250 comprise an elastomeric interface material. Additionally, in certain embodiments, the first divider wall 220 also includes longitudinal protrusions 252, which in certain embodiments comprise an elastomeric interface material.

In operation, when a drive is inserted into the drive carrier 200, the drive applies pressure to the engagement portion 248 in the direction of the divider wall 222, which causes the active bar 230 to move toward the divider wall 222. The protrusions 240 move within the slots 242 of the active bar and keep the active bar moving in a substantially longitudinal direction. Additionally, as the drive is inserted and the active bar moves towards the divider wall 222, the first angled portion 236 of the active bar 230 moves along the leading edge angled portion 242 until the flat portion 234 of the active bar 230 rests against a non-recessed portion of the inner wall of the second divider wall 222. This movement causes the drive holder portions 231 of the active bar 230 to apply a retention pressure against the drive. Accordingly, the active bar 230 provides a retention function for the drive assembly 200. In certain embodiments, this retention pressure is further enhanced by the longitudinal protrusions 250. Additionally, in certain embodiments, this retention pressure is further enhanced by the longitudinal protrusions 252.

Figure 5A:
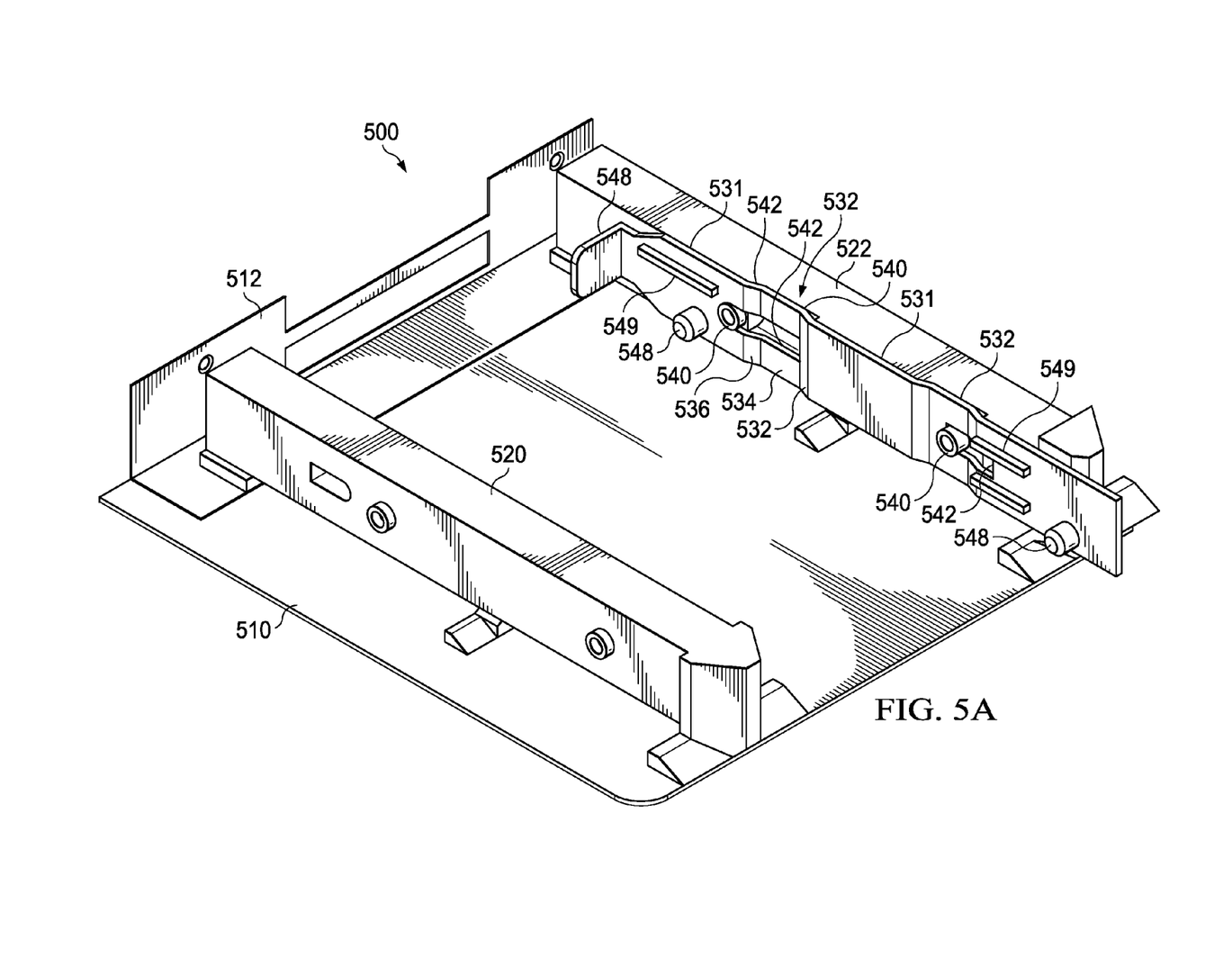
FIGS. 5A-5B, generally referred to as FIG. 5, show a perspective view of another drive carrier.
Figure 5B:
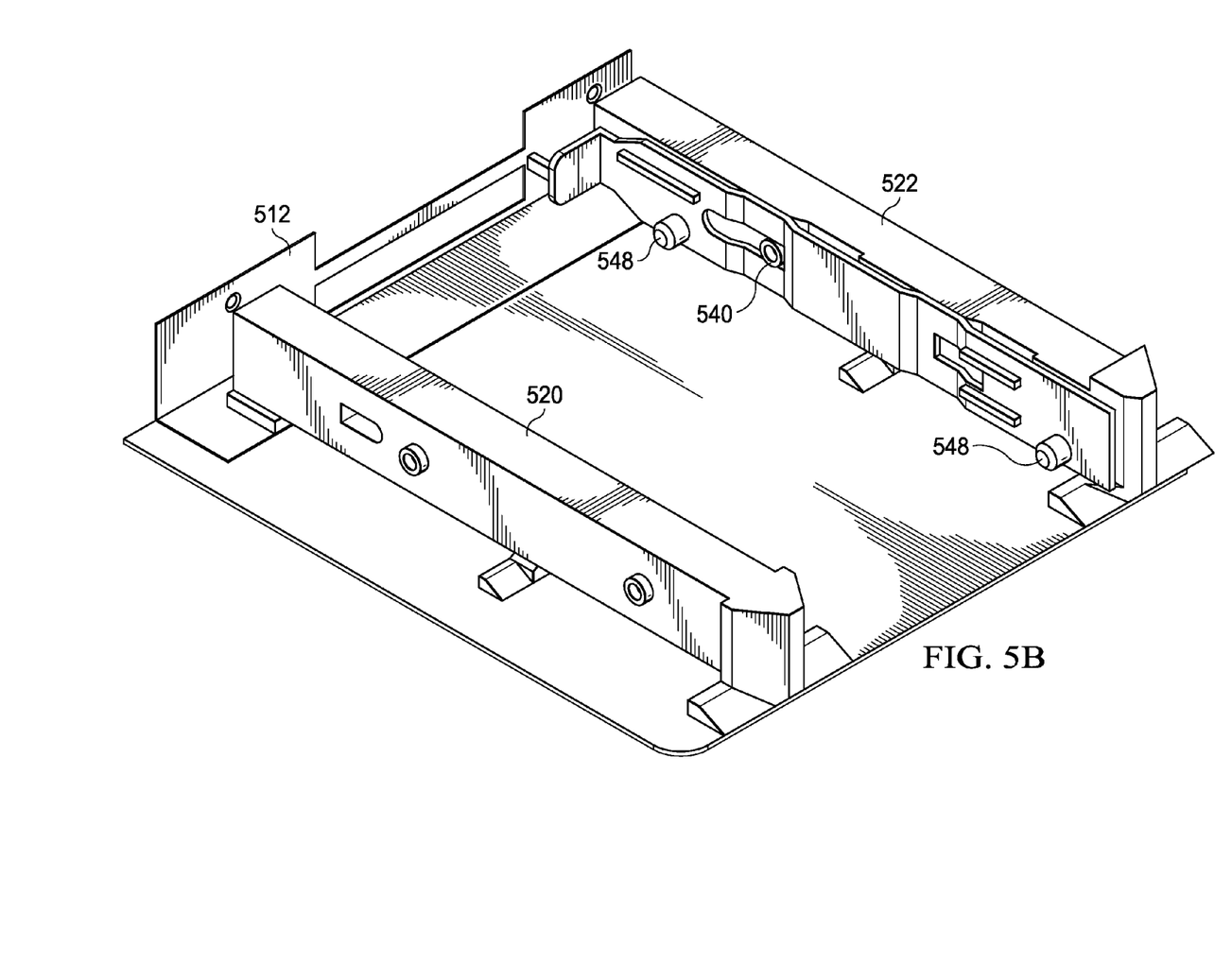
Figure 6:
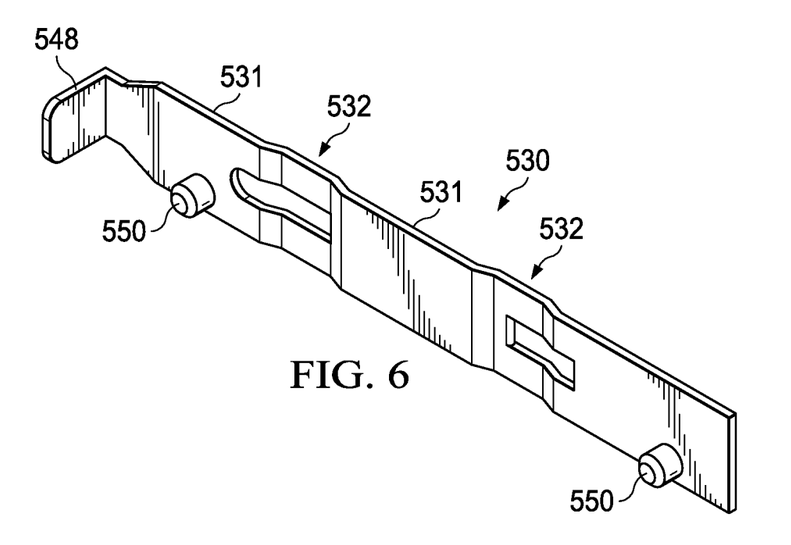
FIG. 6 shows a perspective view of another active bar.

FIG. 5 shows a perspective view of another drive carrier 500, and FIG. 6 shows a perspective view of an active bar for the drive carrier 500. The drive carrier 500 comprises a base 510 to which a nest spine 512 is irremovably attached (e.g., via welding). The drive carrier further comprises a first divider wall 520 and a second divider wall 522. The second divider wall 522 is coupled with an active bar 530.

The active bar 530 (also referred to as a snap-in slide) is movably coupled with the second divider wall 522 via protrusions 540 which project from an inwardly facing surface of the second divider wall 522. The protrusions 540 mate with slots 542 longitudinally positioned in the active bar 530.

The active bar 530 further includes a plurality of drive holder portions 531 as well as first and second indented portions 532. Each indented portion 532 mates with a corresponding recess 533 of the first divider wall 520. Each indented portion 532 includes a flat portion 534 as well as first and second angled portions 536, 537, respectively. In certain embodiments, each recess 533 includes a flat portion 540 as well as a leading edge angled portion 542. When the active bar 530 is in a non-retention position, the flat portion 534 of the active bar substantially mates with the flat portion 534 of the recess. Additionally, when the active bar 530 is in the non-retention position, the first angled portion 536 of the active bar 530 substantially mates with the leading edge angled portion 542 of the recess 533.

The active bar 530 further includes an engagement portion 548 which projects inwardly at substantially (i.e., +/−10%) perpendicular from the portion of the active bar which is coupled with the second divider wall 522. In certain embodiments, the active bar 530 further includes protrusions 548 which mate with a drive. In certain embodiments, the engagement portion 548 and the protrusions 549 along with the protrusions 540 and the slots 542 provide an engagement mechanism for engaging a drive when the drive is inserted into the drive carrier 500.

In certain embodiments, the active bar 530 further comprises a plurality of longitudinal protrusions 550. In certain embodiments, the longitudinal protrusions 550 comprise an elastomeric interface material. Additionally, in certain embodiments, the first divider wall 520 also includes longitudinal protrusions, which in certain embodiments comprise an elastomeric interface material.

In operation, when a drive is inserted into the drive carrier 500, the drive mates with the protrusions 549 and applies pressure to the engagement portion 548 in the direction of the divider wall 522, which causes the active bar 530 to move toward the divider wall 522. The protrusions 540 move within the slots 542 of the active bar and keep the active bar moving in a substantially longitudinal direction. Additionally, as the drive is inserted and the active bar moves towards the divider wall 522, the first angled portion 536 of the active bar 530 moves along the leading edge angled portion 542 until the flat portion 534 of the active bar 530 rests against a non-recessed portion of the inner wall of the second divider wall 522. This movement causes the active bar 530 to apply a retention pressure against the drive. Accordingly, the active bar 530 provides a retention function for the drive assembly 500. In certain embodiments, this retention pressure is further enhanced by the longitudinal protrusions 550. Additionally, in certain embodiments, this retention pressure is further enhanced by the longitudinal protrusions 552.

Figure 7:
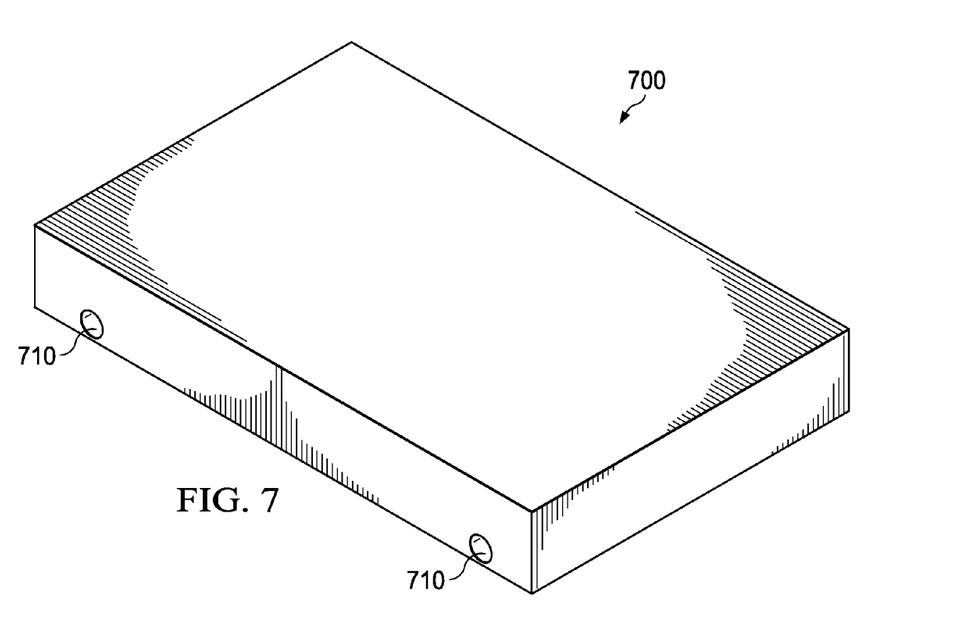
FIG. 7 shows a perspective view of a drive.

FIG. 7 shows a perspective view of a drive 700 which may be used in conjunction with a drive carrier to provide a drive assembly. The drive 700 includes a plurality of indentations 710 with which the protrusions of the drive carrier 700 mate to secure the drive 700 within the drive carrier.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A drive assembly comprising:
   a drive; and,
   a drive carrier, the drive carrier comprising a divider wall and an active bar coupled with the divider wall, the divider wall comprising a recess, the active bar comprising a plurality of drive holder portions, an indented portion and an engagement mechanism, the indented portion mating with the recess of the first divider wall when the active bar is in a non-retention position, the indented portion causing the drive holder portion to exert retention pressure on the drive when the active bar is in a retention position.

2. The drive assembly of claim 1 wherein:
   the indented portion comprises a flat portion and first and second angled portions; and,
   the recess comprises a flat portion and a leading edge angled portion, the flat portion of the active bar substantially mating with the flat portion of the recess when the active bar is in the non-retention position and the first angled portion of the active bar substantially mating with the leading edge angled portion of the recess when the active bar is in the non-retention position.

3. The drive assembly of claim 1 wherein:
   active bar comprises a plurality of indented portions;
   the divider wall comprises a plurality of recesses; and,
   each of the plurality of indented portions mate with a corresponding recess of the plurality of recesses.

4. The drive assembly of claim 1 wherein:
   the divider wall comprises a protrusion; and,
   the active bar comprises a slot, the slot being longitudinally positioned within the active bar, the slot mating with the protrusion.

5. The drive assembly of claim 1 wherein:
   the active bar comprises a plurality of longitudinal protrusions positioned on corresponding drive holder portions.

6. The drive assembly of claim 1 wherein:
   the drive carrier further comprises a second divider wall, the second divider wall comprising a longitudinal protrusion.

7. The drive assembly of claim 1 wherein:
   the active bar comprises a plurality of protrusions positioned on corresponding drive holder portions, the protrusions mating with indentations in the drive.

8. An information handling system comprising:
   a processor;
   a drive assembly coupled to the processor, the drive assembly comprising
   a drive; and,
   a drive carrier, the drive carrier comprising a divider wall and an active bar coupled with the divider wall, the divider wall comprising a recess, the active bar comprising a plurality of drive holder portions, an indented portion and an engagement mechanism, the indented portion mating with the recess of the first divider wall when the active bar is in a non-retention position, the indented portion causing the drive holder portion to exert retention pressure on the drive when the active bar is in a retention position.

9. The information handling system of claim 8 wherein:
   the indented portion comprises a flat portion and first and second angled portions; and,
   the recess comprises a flat portion and a leading edge angled portion, the flat portion of the active bar substantially mating with the flat portion of the recess when the active bar is in the non-retention position and the first angled portion of the active bar substantially mating with the leading edge angled portion of the recess when the active bar is in the non-retention position.

10. The information handling system of claim 8 wherein:
    active bar comprises a plurality of indented portions;
    the divider wall comprises a plurality of recesses; and,
    each of the plurality of indented portions mate with a corresponding recess of the plurality of recesses.

11. The information handling system of claim 8 wherein:
    the divider wall comprises a protrusion; and,
    the active bar comprises a slot, the slot being longitudinally positioned within the active bar, the slot mating with the protrusion.

12. The information handling system of claim 8 wherein:
    the active bar comprises a plurality of longitudinal protrusions positioned on corresponding drive holder portions.

13. The information handling system of claim 8 wherein:
    the drive carrier further comprises a second divider wall, the second divider wall comprising a longitudinal protrusion.

14. The drive assembly of claim 8 wherein:
    the active bar comprises a plurality of protrusions positioned on corresponding drive holder portions, the protrusions mating with indentations in the drive.

* * * * *